(12) United States Patent  
Smidler (10) Patent No.: US 7,527,309 B2
(45) Date of Patent: May 5, 2009

(54) INTEGRATED REAR IMPACT GUARD AND PINTLE HOOK ASSEMBLY

(75) Inventor: Francis S. Smidler, Lafayette, IN (US)

(73) Assignee: Wabash National, L.P., Lafayette, IN (US)

( * ) Notice: Subject to any disclaimer, the term of this patent is extended or adjusted under 35 U.S.C. 154(b) by 167 days.

(21) Appl. No.: 11/625,908

(22) Filed: Jan. 23, 2007

(65) Prior Publication Data

US 2008/0073921 A1 Mar. 27, 2008

Related U.S. Application Data

(60) Provisional application No. 60/827,094, filed on Sep. 27, 2006.

(51) Int. Cl.
B60D 1/56 (2006.01)

(52) U.S. Cl. ...................... 293/155; 280/501

(58) Field of Classification Search ............... 280/500, 280/501, 504, 505; 296/117, 123, 155; 293/117, 293/123, 155
See application file for complete search history.

(56) References Cited

U.S. PATENT DOCUMENTS

| | | | |
|---|---|---|---|
| 2,492,914 A | 12/1949 | Barden | |
| 3,318,617 A | 5/1967 | Burns | |
| 3,501,170 A | 3/1970 | Da Valle | |
| 3,578,358 A * | 5/1971 | Reynolds | 280/500 |
| 3,614,136 A | 10/1971 | Dent | |
| 4,138,152 A * | 2/1979 | Prue | 293/117 |
| 4,273,369 A | 6/1981 | Rosenbaum | |
| 4,319,765 A | 3/1982 | Rosenbaum | |
| 4,645,227 A * | 2/1987 | Callahan | 280/495 |
| 4,738,464 A * | 4/1988 | Putnam | 280/500 |
| 4,993,610 A | 2/1991 | Abretske et al. | |
| RE33,681 E * | 9/1991 | Bundy et al. | 280/500 |
| 5,094,469 A * | 3/1992 | Yamamoto et al. | 293/117 |
| 5,135,274 A * | 8/1992 | Dodd | 293/117 |
| 5,364,142 A | 11/1994 | Coiner | |
| 5,507,515 A * | 4/1996 | Schellenberg et al. | 280/491.5 |
| 5,620,218 A | 4/1997 | Saltzman et al. | |
| 6,139,044 A | 10/2000 | Smith et al. | |
| 6,176,530 B1 * | 1/2001 | Gollungberg | 293/133 |
| 6,443,474 B1 * | 9/2002 | Kay | 280/504 |
| 6,540,277 B2 | 4/2003 | McCoy et al. | |
| 6,709,036 B1 | 3/2004 | Evans | |
| 6,739,613 B2 | 5/2004 | Aquinto et al. | |
| 6,814,379 B2 | 11/2004 | Evans | |
| 6,969,084 B2 | 11/2005 | Kaepp et al. | |
| 2001/0050471 A1 * | 12/2001 | McCoy et al. | 280/504 |
| 2004/0012213 A1 * | 1/2004 | Dellock et al. | 293/117 |

* cited by examiner

*Primary Examiner*—Glenn Dayoan
*Assistant Examiner*—Paul A Chenevert
(74) *Attorney, Agent, or Firm*—Trexler, Bushnell, Giangiorgi, Blackstone & Marr, Ltd (57) ABSTRACT

An integrated rear impact guard and pintle hook assembly is provided which can be releasably secured to the rear underside of a trailer by a plurality of fastening members. The assembly is secured to roadside and curbside slide rails and rear bumper brackets of the trailer under the rear door frame sill. No welding is required for securement of the assembly to the trailer. The assembly includes a rear impact guard which is formed of the rear bumper brackets and a bumper which is attached to the rear bumper brackets at their lower ends. The assembly further includes a main channel which is connected at its opposite ends to the rear bumper brackets, a mount which is connected to the main channel at a center thereof, and a mount plate which is releasably secured to the main channel. A pintle hook may be secured to the mount and mount plate.

24 Claims, 14 Drawing Sheets

FIG. 33 ated pintle hook and rear impact guard structure which is secured to the rear under- side of a dry freight van trailer in a releasably securable manner.

INTEGRATED REAR IMPACT GUARD AND PINTLE HOOK ASSEMBLY

CROSS-REFERENCE AND INCORPORATION BY REFERENCE

This application claims the domestic priority of U.S. Provisional Application Ser. No. 60/827,094, filed on Sep. 27, 2006, and entitled "Pintle Hook And Rear Impact Guard". U.S. Provisional Application Ser. No. 60/827,094 is hereby incorporated by reference in its entirety.

BACKGROUND OF THE INVENTION

The invention is directed to an integrated pintle hook and rear impact guard structure which is secured to the rear underside of a dry freight van trailer in a releasably securable manner.

It is known in the prior art to have dry freight van trailers which include pintle hooks and rear impact guards, however, these pintle hooks and rear impact guards are typically welded to the dry freight van trailers for installation. Welding of the pintle hooks and rear impact guards requires substantial assembly time, fabrication effort and fabrication cost and results in the pintle hooks and rear impact guards being permanently secured to the trailer. Therefore, it would be desirable to have a pintle hook and rear impact guard structure which is secured to the rear underside of a dry freight van trailer in a manner other than welding. The present invention provides such a pintle hook and rear impact guard structure as it is configured to be secured to the dry freight van trailer in a releasably securable manner such that assembly time, fabrication effort and fabrication costs may be substantially reduced.

SUMMARY OF THE INVENTION

Briefly, and in accordance with the foregoing, the invention provides an integrated rear impact guard and pintle hook assembly which can be releasably secured to the rear underside of a trailer by a plurality of fastening members. The rear impact guard and pintle hook assembly is secured to roadside and curbside slide rails and rear bumper brackets of the trailer under the rear door frame sill, preferably by bolts. No welding is required for securement of the rear impact guard and pintle hook assembly to the trailer. The rear impact guard and pintle hook assembly includes a rear impact guard which is formed of the rear bumper brackets and a bumper which is attached to the rear bumper brackets at their lower ends. The rear impact guard and pintle hook assembly further includes a pintle hook main channel which is connected at its opposite ends to the rear bumper brackets, a pintle hook mount which is connected to the pintle hook main channel at a center thereof, and a pintle hook mount plate which is secured to the pintle hook main channel. A pintle hook may be secured to the pintle hook mount and to the pintle hook mount plate.

BRIEF DESCRIPTION OF THE DRAWINGS

The features of the invention which are believed to be novel are described in detail hereinbelow. The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE ILLUSTRATED EMBODIMENT

While this invention may be susceptible to embodiment in different forms, there is shown in the drawings and will be described herein in detail, a specific embodiment with the understanding that the present disclosure is to be considered an exemplification of the principles of the invention, and is not intended to limit the invention to that as illustrated.

An integrated rear impact guard and pintle hook assembly 20 is provided for use on a rear end of a trailer 22. The assembly 20 is formed as a separate unit from the trailer 22 and can be secured onto the trailer 22 after assembly in a releasably securable manner. This reduces the cost of providing a pintle hook 24 on the trailer 22 by reducing assembly time. Fabrication effort and cost are also reduced.

Figure 1:
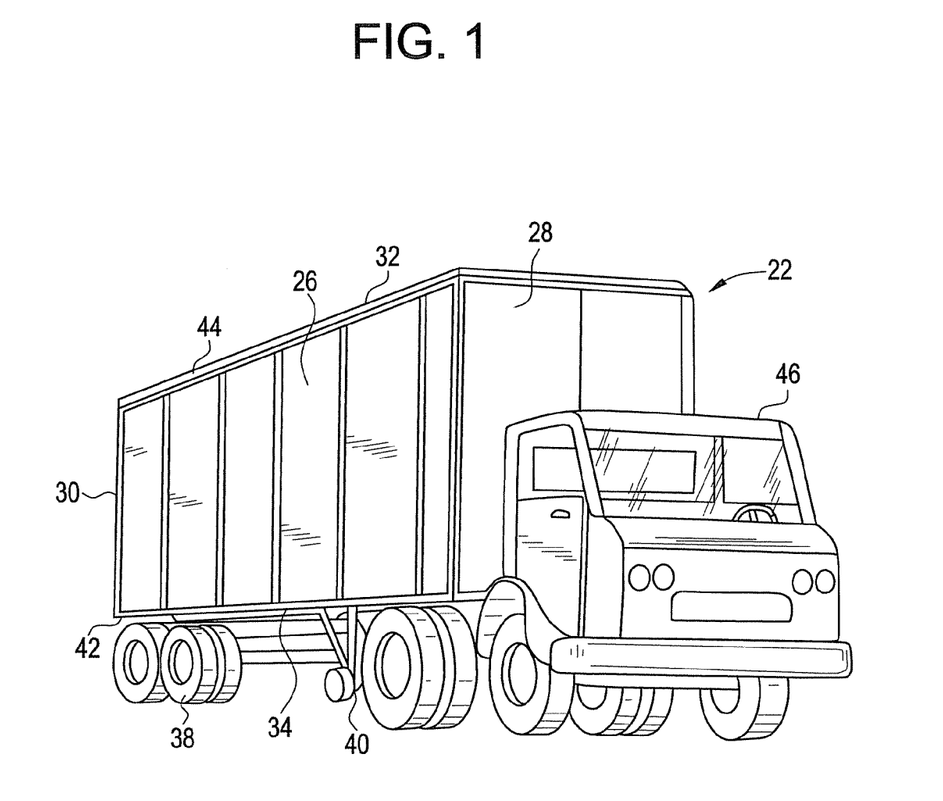
FIG. 1 is a perspective view of a tractor and a trailer.
Figure 8:
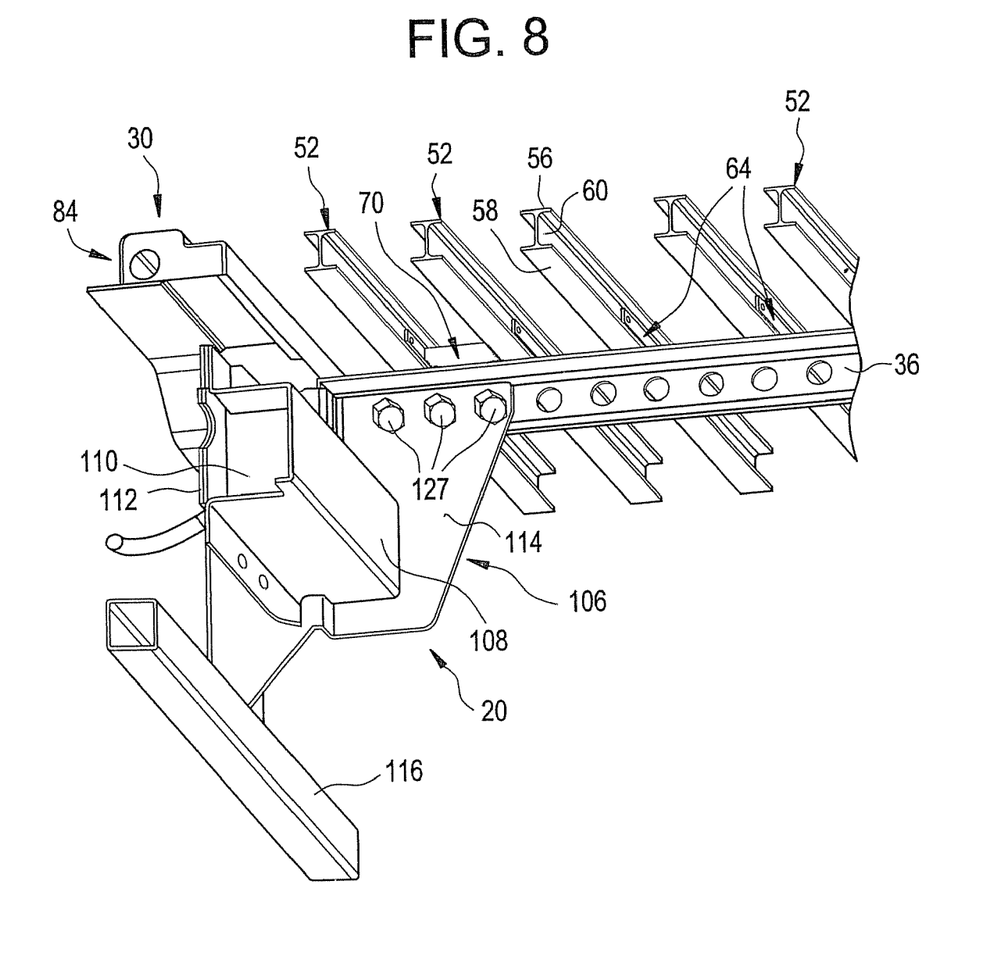
FIG. 8 is an alternative perspective view to FIG. 7 of the rear impact guard and pintle hook assembly secured to a rear portion of the floor structure of the trailer.
Figure 9:
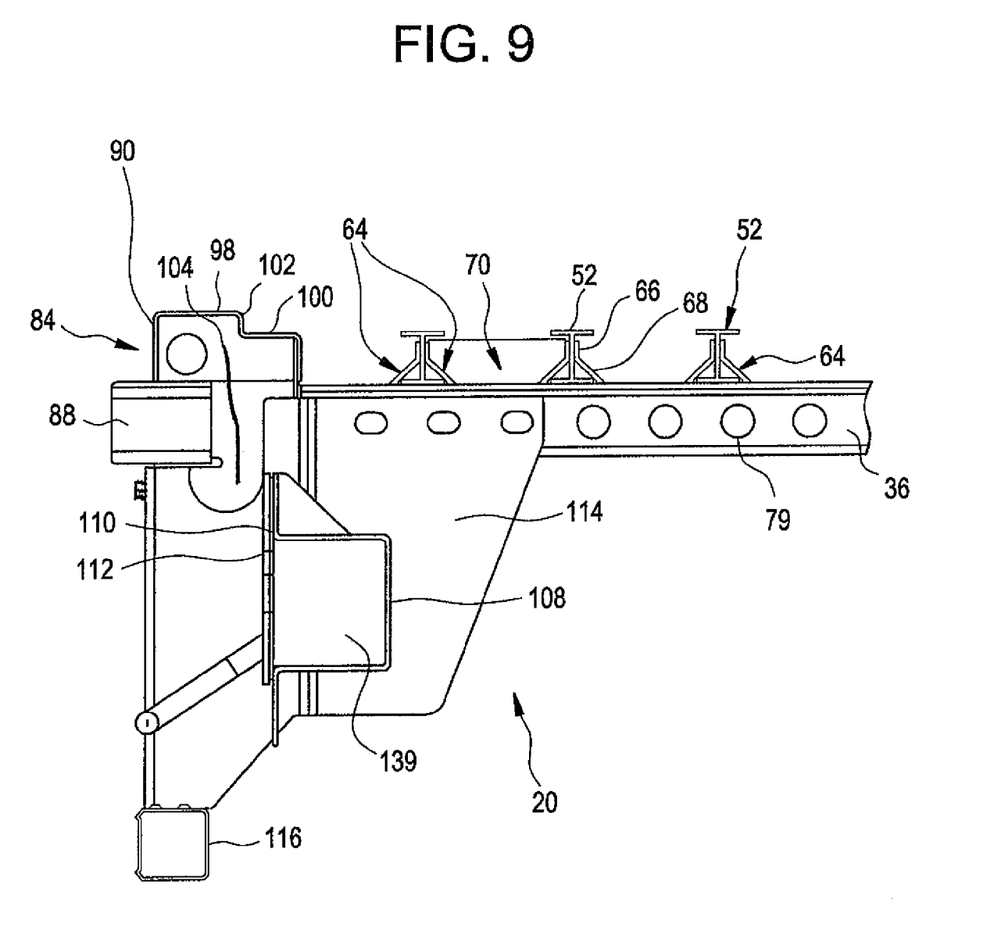
FIG. 9 is a cross-sectional view of the rear impact guard and pintle hook assembly being secured to a rear portion of the floor structure of the trailer.
Figure 10:
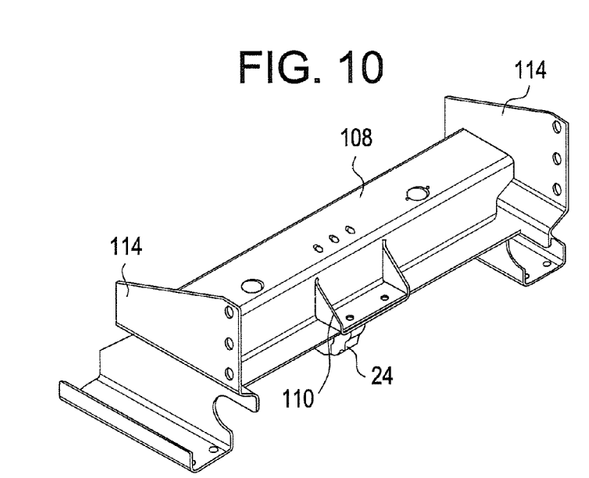
FIG. 10 is an alternative perspective view to FIG. 3 of the rear impact guard and pintle hook assembly.
Figure 11:
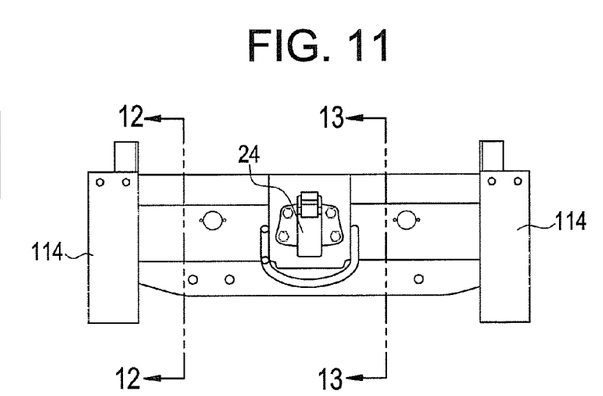
FIG. 11 is a bottom plan view of the rear impact guard and pintle hook assembly.
Figure 12:
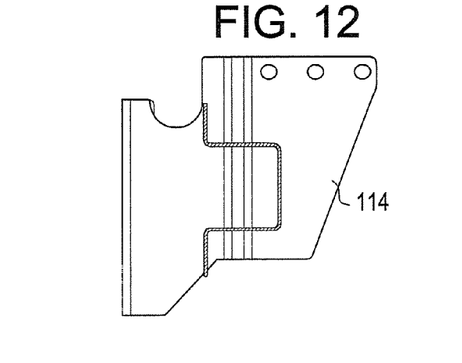
FIG. 12 is a cross-sectional view of the rear impact guard and pintle hook assembly taken along line 12-12 of FIG. 1.
Figure 13:
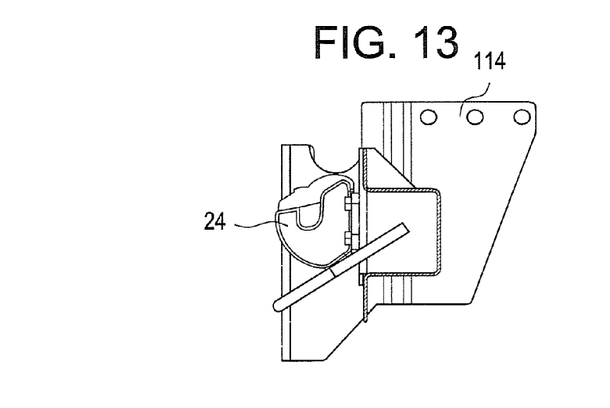
FIG. 13 is a cross-sectional view of the rear impact guard and pintle hook assembly taken along line 13-13 of FIG. 11.

As best illustrated in FIG. 1, the trailer 22 includes a body formed from a pair of rectangular sidewalls 26, a front wall 28, rear frame 30 and the associated doors (not shown), a roof structure 32, and a floor structure 34. A pair of conventional slide rails 36, see FIGS. 8 and 9, are attached beneath the floor structure 34 in a conventional manner. A conventional slidable rear undercarriage assembly 38 is mounted in a conventional manner to the slide rails 36. A landing gear 40 is secured underneath the front of the floor structure 34. The floor structure 34 and a lower portion of each sidewall 26 are secured to a respective baserail 42 which extends the length of the trailer 22. The baserails 42 are preferably formed of aluminum, which may be extruded. The roof structure 32 and an upper portion of each sidewall 24 are secured to a respective top rail 44 which extends the length of the trailer 22. The top rails 44 are preferably formed of aluminum, which may be extruded. The trailer 22 can be connected to a tractor 46 by conventional means, such as a fifth wheel assembly, at its front end.

Figure 2:
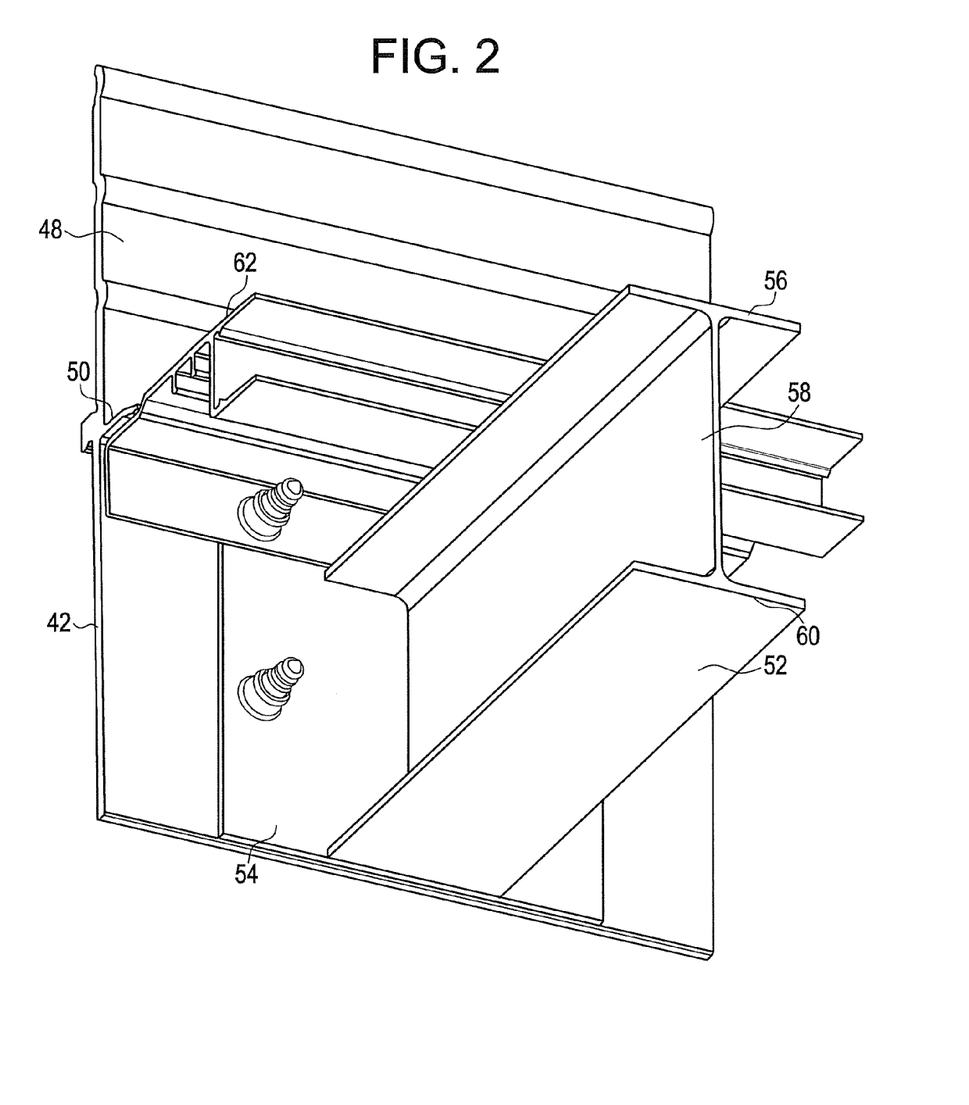
FIG. 2 is a perspective view of a floor structure of the trailer of FIG. 1 connected to a baserail of the trailer.
Figure 3:
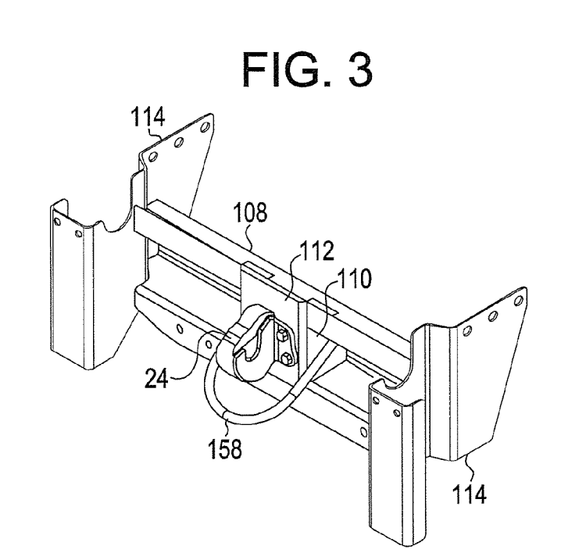
FIG. 3 is a perspective view of a rear impact guard and pintle hook assembly which incorporates features of the invention.
Figure 4:
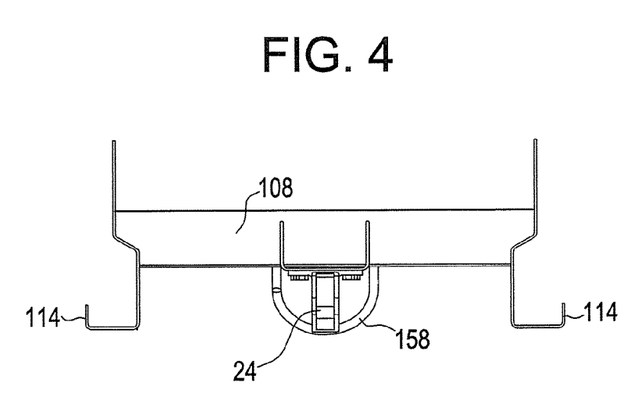
FIG. 4 is a top plan view of the rear impact guard and pintle hook assembly.
Figure 5:
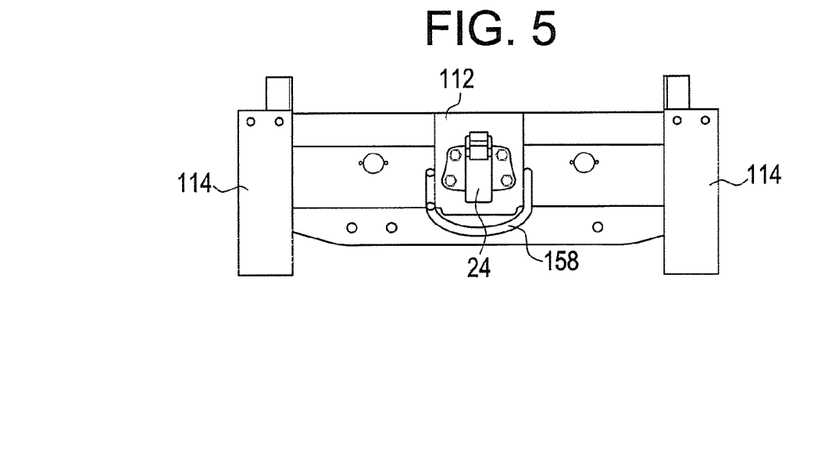
FIG. 5 is a front elevational view of the rear impact guard and pintle hook assembly.
Figure 6:
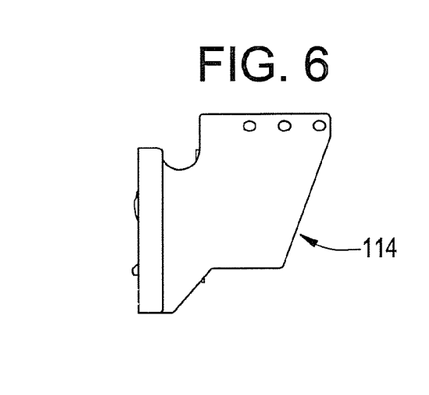
FIG. 6 is a side elevational view of the rear impact guard and pintle hook assembly.

The baserail 42 is formed of a vertical wall 48 which has a generally horizontal flange 50 extending perpendicularly therefrom. The sidewall 26 is attached to an upper portion of the baserail 42 by suitable means.

As illustrated in FIG. 2, the floor structure 34 includes a plurality of spaced apart cross-members 52 (only one of which is shown in FIG. 2) attached to the baserail 42. Each cross-member 52 is mounted to the baserail 42 by an end clip 54 at the opposite ends of the cross-member 52. Each cross-member 52 is integrally formed from an I-beam that includes an upper horizontal wall 56, a lower horizontal wall 60 and a vertical bridge wall 58 extending between the upper and lower walls 56, 60 at the midpoint thereof. Each cross-member 52 extends across the width of the trailer 22 and a floor (not shown) generally sits on the upper surface of the cross-members 52.

The end clip 54 is a plate. As shown, the end clip 54 is square, but the end clip 54 may take other forms. Apertures are provided, such as by punching, through the end clip 54 to allow bolts to pass therethrough to connect the end clip 54 to the baserail 42.

A floor seal 62 is attached to the baserail 42 by bolts, is mounted on top of the cross-members 52, and extends along the length of the trailer 22. The floor seal 62 captures an end of the floor so that the floor is secured to the floor seal 62.

Figure 7:
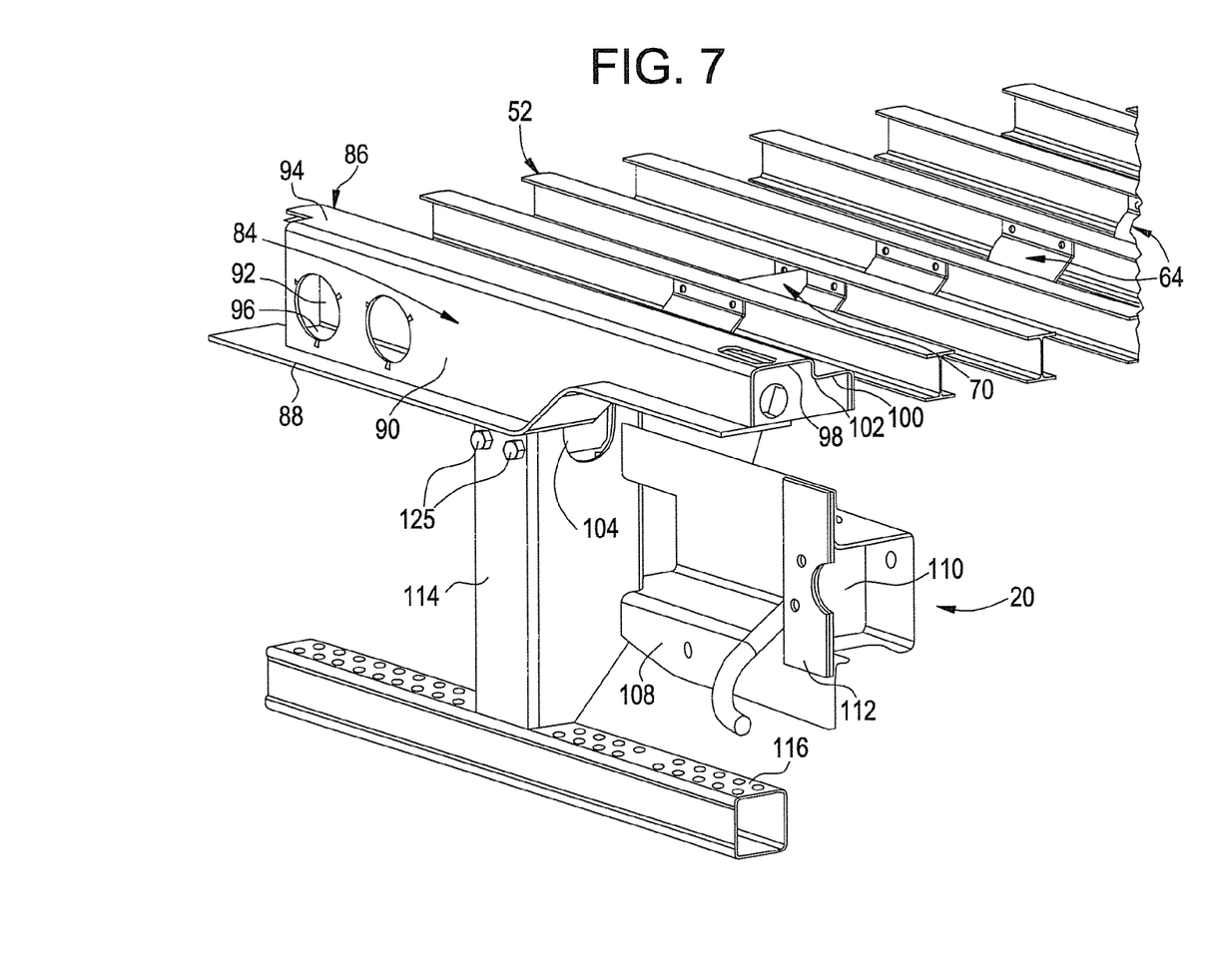
FIG. 7 is a perspective view of the rear impact guard and pintle hook assembly secured to a rear portion of the floor structure of the trailer.

As shown in FIGS. 7 and 8, four gussets 64 (only two of which are shown in the drawings) are provided on each of the cross-members 52. Two gussets 64 are provided along the roadside of the trailer 22, and two gussets 64 are provided along the curbside of the trailer 22. The gussets 64 aid in preventing deflection of the cross-members 52 and therefore provide stability for the cross-members 52. As illustrated in FIG. 9, each gusset 64 is formed from a vertical wall 66 which is attached to the respective vertical bridge wall 58 and an angled wall 68 which angles away from vertical bridge wall 58 and end adjacent to the outer end of the lower horizontal wall 52. The vertical wall 66 is welded or otherwise secured to the vertical bridge wall 58.

Figure 14:
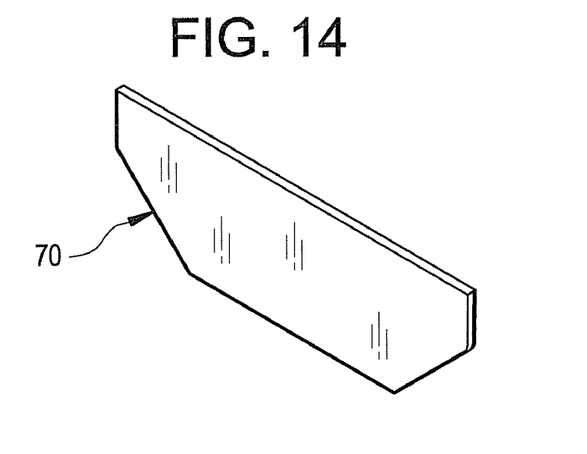
FIG. 14 is a perspective view of an intercostal.
Figure 15:
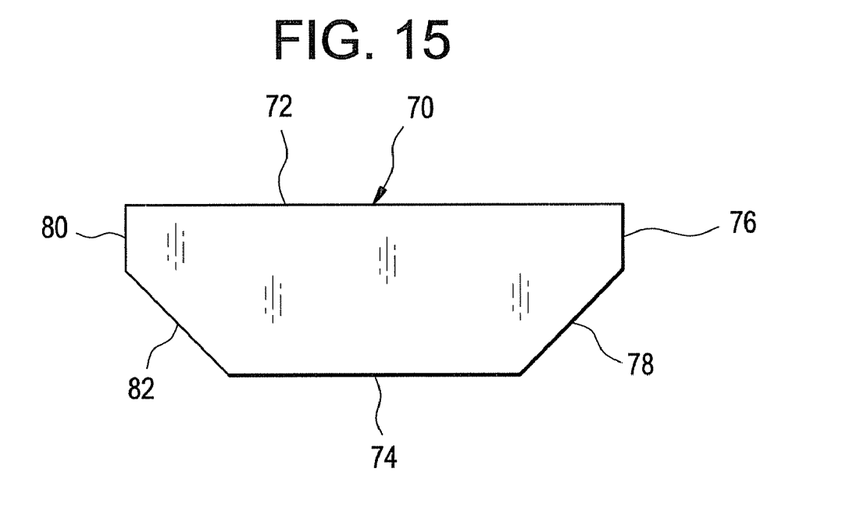
FIG. 15 is a front elevational view of the intercostal.
Figure 16:
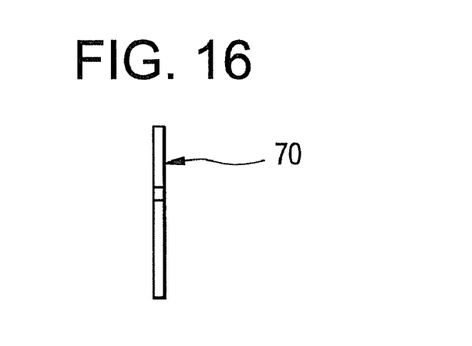
FIG. 16 is a side elevational view of the intercostal.
Figure 17:
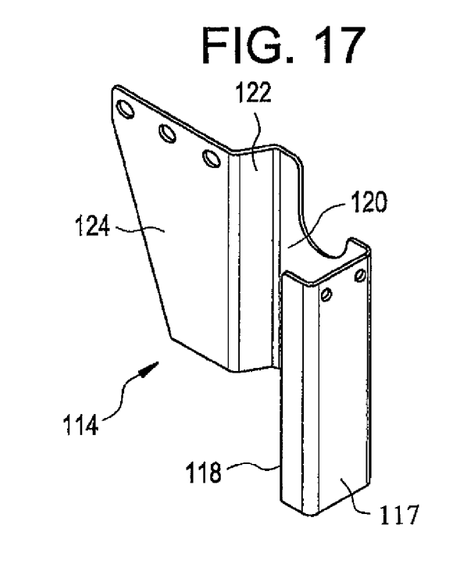
FIG. 17 is a perspective view of a roadside bumper bracket utilized in the rear impact guard and pintle hook assembly.
Figure 18:
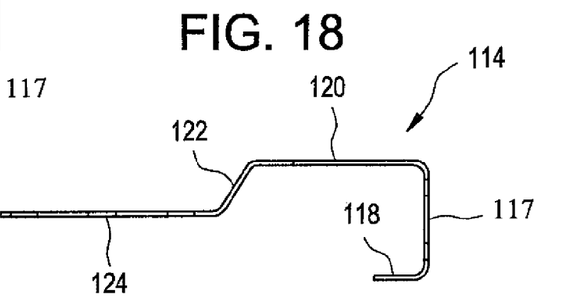
FIG. 18 is a top plan view of the roadside bumper bracket.
Figure 19:
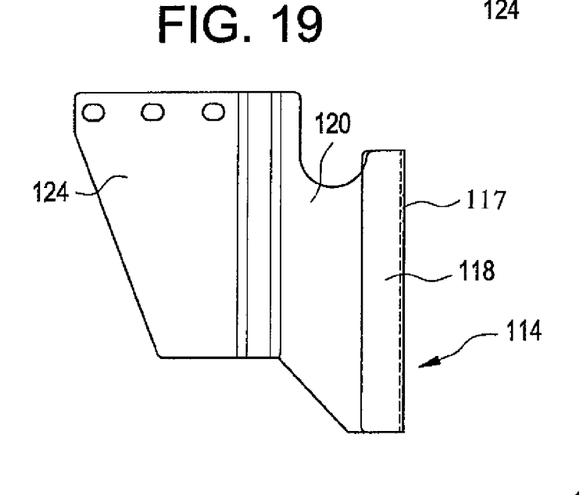
FIG. 19 is a front elevational view of the roadside bumper bracket.
Figure 20:
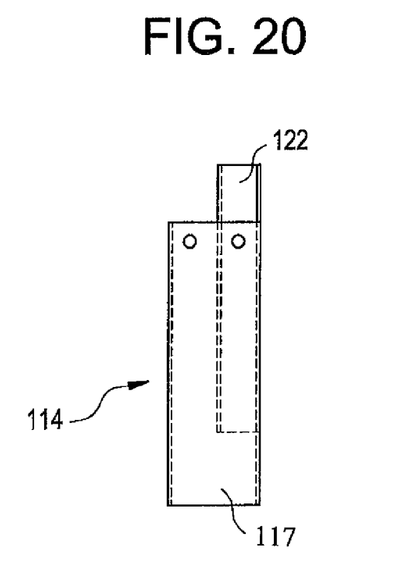
FIG. 20 is a side elevational view of the roadside bumper bracket.
Figures 21, 22:
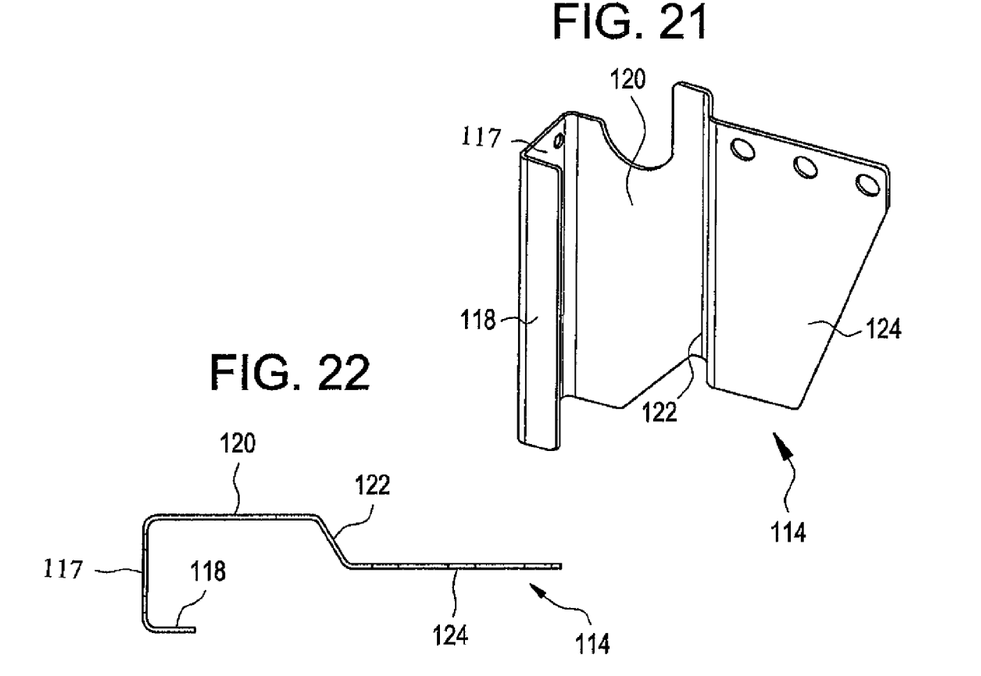
FIG. 21 is a perspective view of a curbside bumper bracket utilized in the rear impact guard and pintle hook assembly.
FIG. 22 is a top plan view of the curbside bumper bracket.
Figure 23:
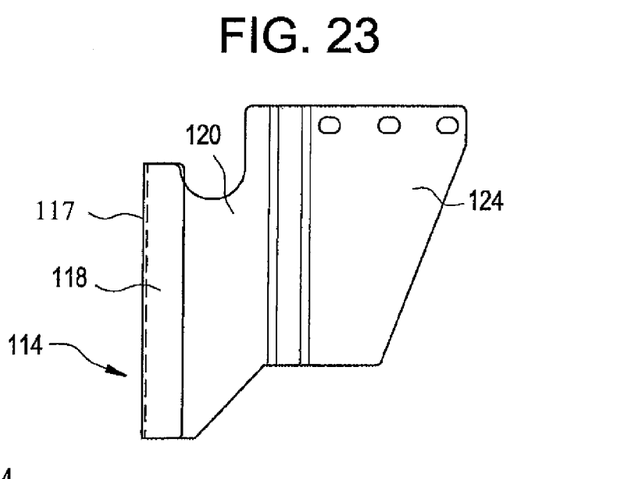
FIG. 23 is a front elevational view of the curbside bumper bracket.
Figure 24:
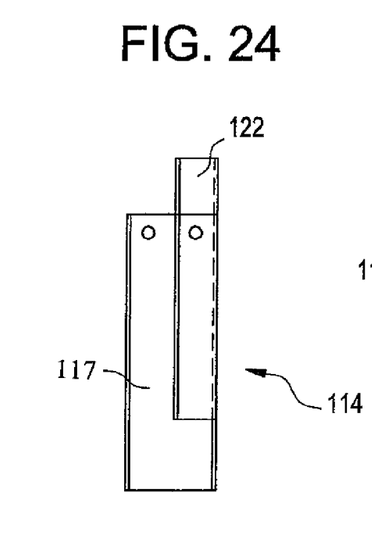
FIG. 24 is a side elevational view of the curbside bumper bracket.

On each side of the trailer 22, an intercostal 70 is provided between the gussets 64 mounted on the last two cross-members 52 which are the ones closest to the rear frame 30. As shown in FIGS. 14-16, the intercostal 70 is formed from a plate having an upper horizontal edge 72, a lower horizontal edge 74, a front edge and a rear edge. The front and rear edges mirror the shape of the gussets 64 and, therefore the front edge includes a front upper vertical edge 76 and a front lower angled edge 78, and the rear edge includes a rear upper vertical edge 80 and a rear lower angled edge 82. The ends of the upper horizontal edge 72 sit under the upper horizontal walls 56 of the adjacent cross-members 52, the front and rear vertical edges 76, 80 sit against the vertical walls 66 of the adjacent gussets 64, the front and rear angled edges 78, 82 sit against the angled walls 68 of the adjacent gussets 64, and the lower horizontal edge 74 sits on the upper surface of the upper end of the slide rail 36.

The slide rails 36, shown in FIG. 8, are connected to the underside of the cross-members 52 at spaced apart positions, and extend generally along the length of the trailer 22. As is known in the art, the slide rails 36 are elongated members with a plurality of spaced apart apertures 79 therethrough. This allows the undercarriage assembly 38 to be secured to the slide rails 36 at a variety of positions as is known in the art.

At the rear end of the trailer 22, the rear frame 30 forms a rectangular opening into which the rear doors (not shown) are provided. As is known in the art, the rear frame 30 includes an elongated horizontal sill 84, a pair of vertical posts (not shown) that extend upwardly from the opposite ends of the sill 84, and an elongated horizontal top member (not shown). The posts are connected to the respective sidewalls 26 by known means. The opposite ends of the sill 84 are connected to the respective baserails 42 by known means. The opposite ends of the top member are connected to the respective top rails 44 by known means.

As is known in the art, the sill 84 has an fantail 86 and a base plate 88 attached to the underside of the fantail 86. The fantail 86 has a vertical rear wall 90, a vertical front wall 92, a top wall 94 which connects the upper ends of the rear and front walls 90, 92, and a lower wall 96 which connects the lower ends of the rear and front walls 90, 92. The top wall 94 is formed of a rear wall portion 98 which is connected to the upper end of the rear wall 90, a front wall portion 100 which is connected to the upper end of the front wall 92, and a vertical wall 102 which connects the rear wall portion 98 to the front wall portion 100. The front wall portion 100 is stepped downwardly from the rear wall portion 98. Along a center portion of the fantail 86, the bottom wall 96, and the lower ends of the rear and front walls 90, 92 are cutaway to form an offset with the remainder of the fantail 86. On each end of the fantail 86, the base plate 88 is attached to the underside of the bottom wall 96 and follows the contour thereof. In the center portion of the fantail 86, the base plate 88 is attached to the bottom end of the rear wall 90 and follows the contour thereof. Along the sides and rear of the trailer 22, the base plate 88 extends outwardly from the perimeter of the fantail 86.

Proximate to each side of the cutaway in the fantail 86, a vertical bumper support member 104 (only one of which is shown) extends downwardly from the horizontal sill 88, thereby defining a roadside bumper support member and a curbside bumper support member. Each vertical bumper support member 104 is generally formed as a tube having a rear wall, a front wall and a pair of sidewalls connecting the rear and front walls. On one side of the trailer 22, the gussets 64 are aligned with the roadside vertical bumper support member 104; on the other side of the trailer 22, the gussets 64 are aligned with the curbside bumper support member.

The integrated rear impact guard and pintle hook assembly 20 is best illustrated in FIGS. 3-13 and 17-35 and generally includes a rear impact guard 106, a pintle hook main channel 108, a pintle hook mount 110, and a pintle hook mount plate 112. The assembly 20 is formed as a separate unit from the trailer 22 and is mounted on the trailer 22 after assembly. The assembly 20 has very few parts and is easy to assemble. The components are formed of metal.

The rear impact guard 106 includes a pair of spaced apart vertical bumper brackets 114 and a horizontal bumper 116 which is mounted to the lower ends of the bumper brackets 114.

As illustrated in FIGS. 17-24, each bumper bracket 114 is formed from a rear wall 117, an end wall 118 which extends forwardly from a first side of the rear wall 117 and terminates in a free end, a rear sidewall 120 which extends forwardly from the second opposite end of the rear wall 117, an angled wall 122 which extends from the opposite end of the rear sidewall 120 to a forwardly extending front sidewall 124. The front sidewall 124 terminates in a free end. The rear wall 117, the end wall 118 and a rear portion of the rear sidewall 120 form a recess into which the respective bumper support member 104 is mounted. The rear wall 117 has apertures at its upper end provided therethrough which allow fastener members 125, such as bolts, to pass for attachment to the rear wall of the bumper support member 104.

Figure 25:
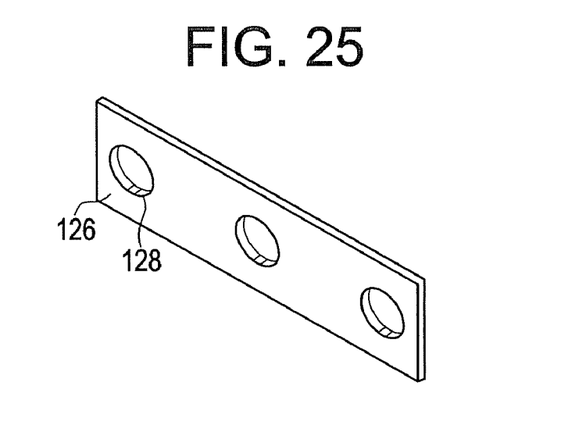
FIG. 25 is a perspective view of a spacer utilized in the rear impact guard and pintle hook assembly.
Figure 26:
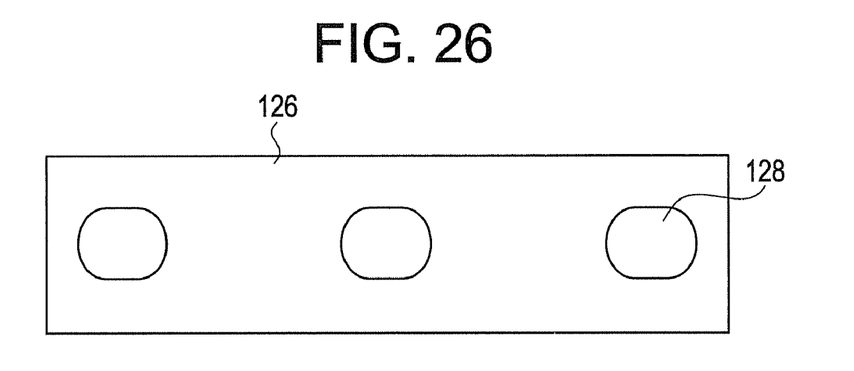
FIG. 26 is a front elevational view of the spacer.
Figure 27:
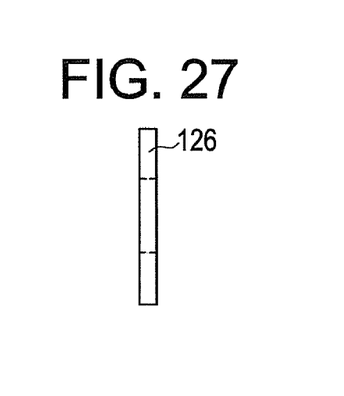
FIG. 27 is a side elevational view of the spacer.

The front sidewall 124 has apertures at its upper end provided therethrough which allow fastener members 127, such as bolts, to pass for attachment to the respective slide rail 36 by a spacer 126. The spacer 126 is provided between the respective slide rail 36 and the front portion of the front sidewall 124 to reduce the size of the apertures 79 provided through the slide rail 36 for proper mating with the front sidewall 124. As illustrated in FIGS. 25-27, the spacer 126 is a generally rectangular plate with a plurality of spaced apertures 128 therein. The spacer 126 mates with the respective slide rail 36 and with the respective front sidewall 124. On each side of the trailer 22, the front sidewall 124 extends forwardly such that the intercostal 70 is provided above the forward end of the front sidewall 124.

The horizontal bumper 116 is formed as a closed end tube. The bumper 116 is secured to the lower ends of the rear wall 117, the end wall 118 and a rear portion of the rear sidewall 120 by suitable means, such as welding.

Figure 28:
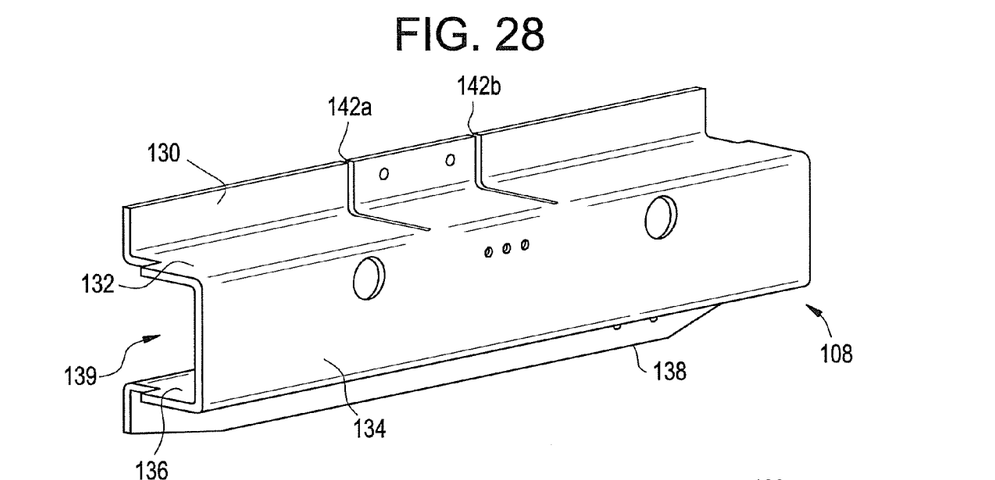
FIG. 28 is a perspective view of a pintle hook main channel utilized in the rear impact guard and impact hook assembly.
Figure 29:
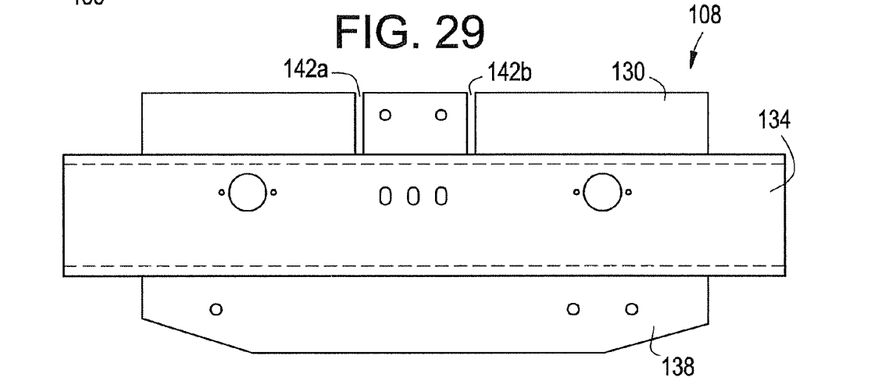
FIG. 29 is a front elevational view of the pintle hook main channel.
Figure 30:
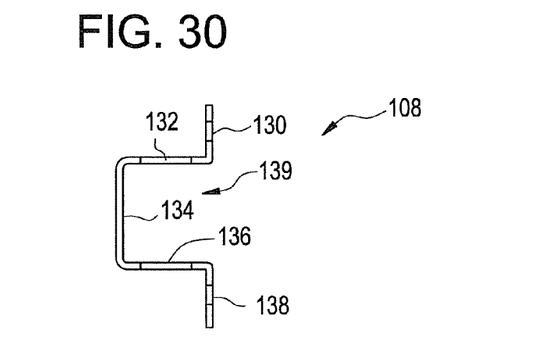
FIG. 30 is a side elevational view of the pintle hook main channel.

As illustrated in FIGS. 28-30, the pintle hook main channel 108 is generally formed as a "hat" shape and is connected at its ends to a forward portion of the rear sidewall 120, the angled wall 122 and the front sidewall 124 of the bumper bracket 114. The cutaway in the sill 84 forms a clearance to allow the pintle hook main channel 108 to be mounted at the appropriate position. The channel 108 has an upper vertical wall 130, an upper horizontal wall 132 extending from the lower end of the upper vertical wall 130, an intermediate vertical wall 134 extending from the front edge of the upper horizontal wall 132, a lower horizontal wall 136 extending from the lower end of the intermediate vertical wall 134, and a lower vertical wall 138 extending from the rear end of the lower horizontal wall 136. An open groove 139 is defined by the upper horizontal wall 132, the intermediate vertical wall 134, and the lower horizontal wall 136. A pair of spaced apart recesses 142a, 142b are provided through the upper vertical wall 130 and the upper horizontal wall 132, equidistantly spaced from the center of the channel 108.

Figure 31:
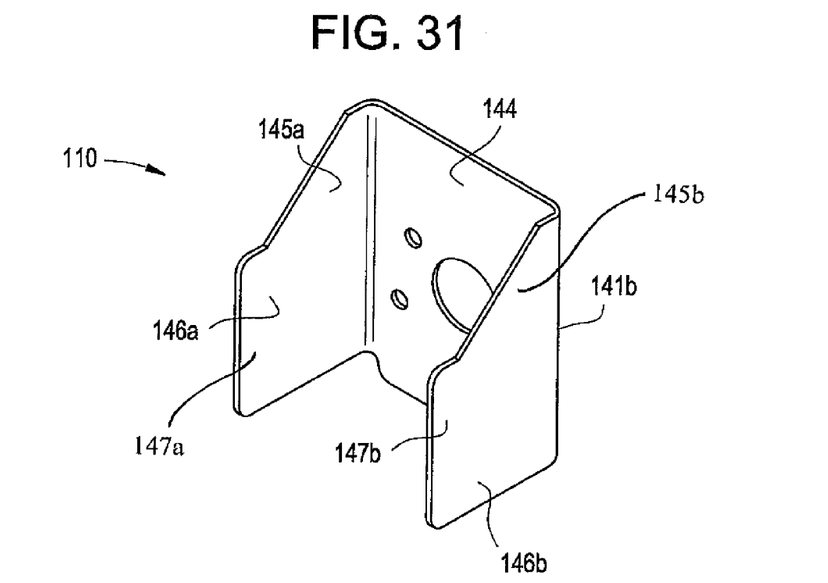
FIG. 31 is a perspective view of a pintle hook mount utilized in the rear impact guard and impact hook assembly.
Figure 32:
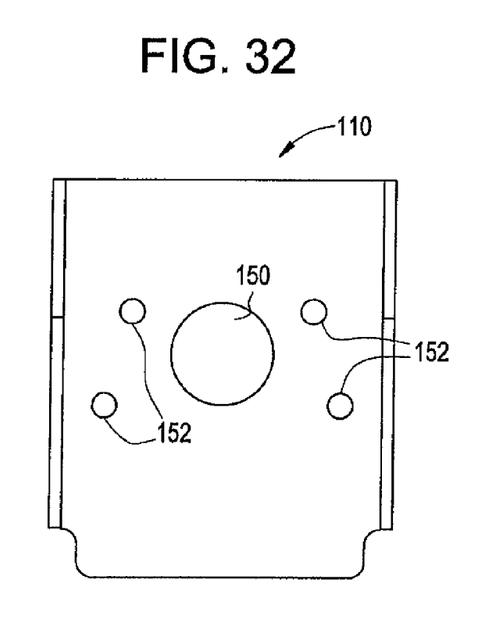
FIG. 32 is a front elevational view of the pintle hook mount.
Figure 33:
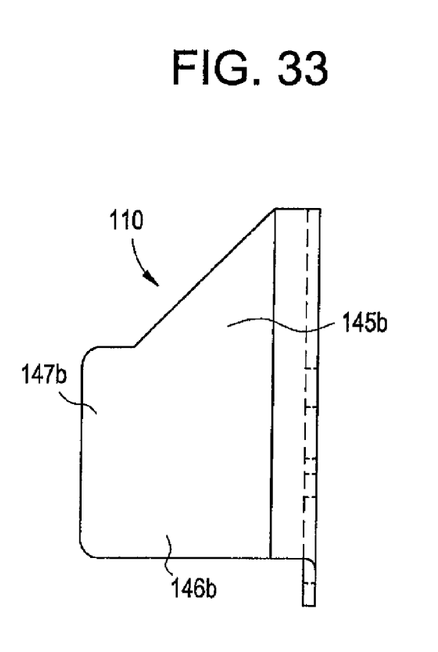
FIG. 33 is a side elevational view of the pintle hook mount.

As illustrated in FIGS. 31-33, the pintle hook mount 110 is formed as a generally U-shaped member having a rear wall 144 and a pair of sidewalls 146a, 146b which extend forwardly from opposite sides thereof. A rearward portion 145a, 145b of the sidewalls 146a, 146b have an upper edge which angles downwardly to a front portion 147a, 147b which has an upper edge that is horizontal. As shown, the rear wall 144 has a large central aperture 150 and four smaller apertures 152 proximate to the central aperture 150. The front portions 147a, 147b seat within the groove 139 of the pintle hook main channel 108 such that the forward edge of the mount 110 abuts the intermediate vertical wall 134. The rearward portion 145a, 145b extends through the recesses 142a, 142b provided in the pintle hook main channel 108. As a result, the pintle hook mount 110 is positioned at the centerpoint of the pintle hook main channel 108 and is secured thereto by suitable means, such as welding.

Figure 34:
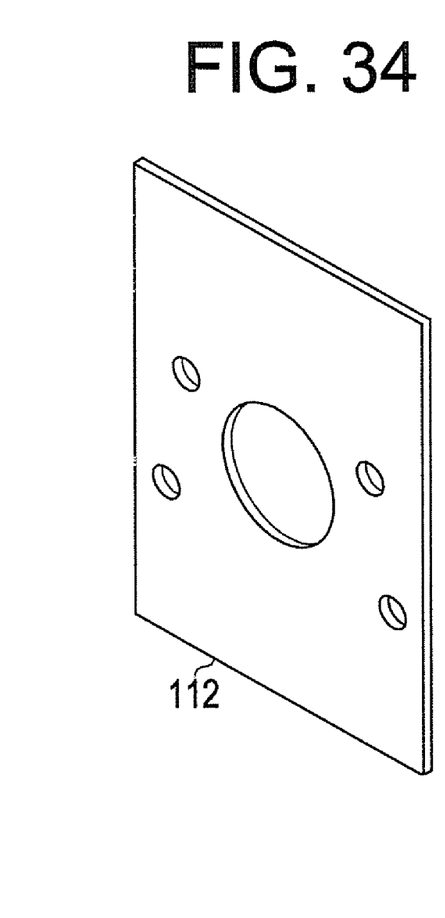
FIG. 34 is a perspective view of a pintle hook mounting plate utilized in the rear impact guard and impact hook assembly.
Figure 35:
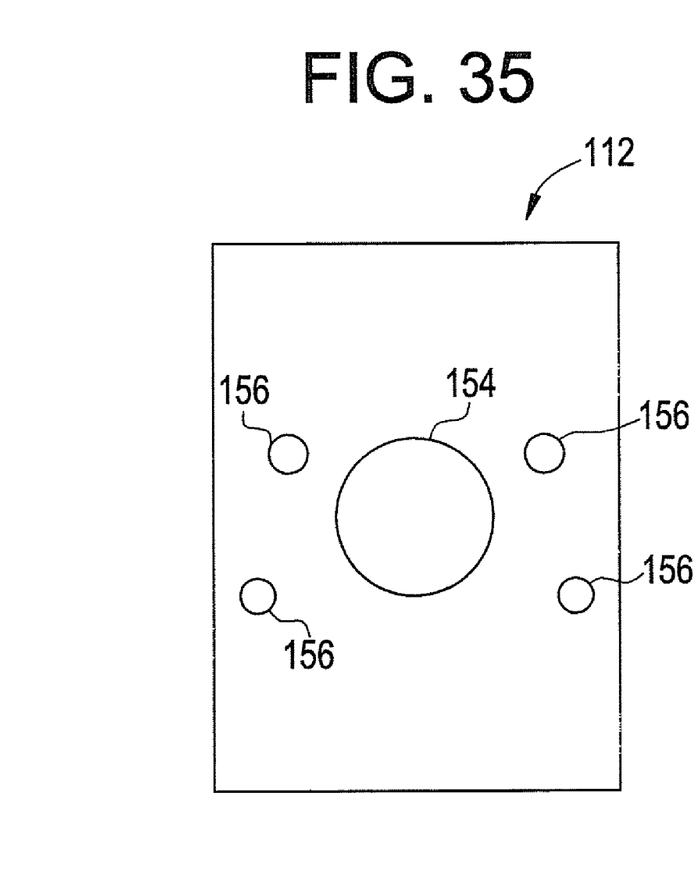
FIG. 35 is a front elevational view of the pintle hook mounting plate.

As illustrated in FIGS. 34 and 35, the mounting plate 112 is a flat plate that has apertures 154, 156 which mirror the apertures 150, 152 provided in the rear wall 144 of the pintle hook mount 110. The mounting plate 112 is attached at its upper and lower ends to the upper and lower vertical walls 130, 138 of the pintle hook main channel 108 such that the apertures 154, 156 align with the apertures 150, 152 through the pintle hook mount 110. A conventional pintle hook 24, for example the Premier 270 pintle hook, is mounted to the mounting plate 112 by bolts which extend through the pintle hook 24, through the apertures 156 in the mounting plate 112 and through the apertures 152 in the pintle hook mount 110.

While specific apertures 150, 152, 154, 156 are shown through the pintle hook mount 110 and the mounting plate 112, it is to be understood that different aperture arrangements may be provided to accommodate different pintle hooks which are to be mounted thereto.

A safety hook loop 158 is also provided in the assembly 20. The safety hook loop 158 is a steel member which is used to hook to safety chains as is known.

Because the integrated rear impact guard and pintle hook assembly 20 is formed as a separate sub-assembly and then bolted onto the trailer 22, there is no welding to attach the pintle hook 24 to the trailer 22. This makes the assembly of the trailer 22 and the pintle hook 24 very easy.

The assembly 20 also has a number of other advantages. The assembly 20 can accept both Premier 270 and Premier 470 pintle hooks. Premier 270 pintle hooks use four bolts for mounting while the Premier 470 pintle hooks use eight bolts for mounting. The assembly 20 also meets all requirements of the TTMA RP 6-01 and SAE J849 Standards. The assembly 20 further has mounting locations for electrical 7-way connector and air system gladhand mounting. The assembly 20 further incorporates a new trailer rear underride structure that meets all requirements of the Canadian CMVSS 223 Safety Standard. All components of the assembly 20 are also optimized for minimum self weight.

While a preferred embodiment of the invention is shown and described, it is envisioned that those skilled in the art may devise various modifications without departing from the spirit and scope of the foregoing description, the attached drawings and the appended claims.

The invention is claimed as follows:

1. A rear impact guard and pintle hook assembly configured to be releasably secured to a rear underside of a trailer, said rear impact guard and pintle hook assembly comprising:
   a rear impact guard having a roadside bumper bracket and a curbside bumper bracket which are spaced apart from one another, and a bumper which is mounted to lower ends of each said bumper bracket;
   a main channel having first and second opposite ends and defining a groove which extends from said first end to said second end, said groove being open to a rear end of the trailer, said first end of said main channel being connected to said roadside bumper bracket, said second end of said main channel being connected to said curbside bumper bracket;
   a mount secured to said main channel between said first and second ends of said main channel; and
   a plurality of fasteners which are configured to releasably secure said roadside and curbside bumper brackets to the rear underside of the trailer.

2. The rear impact guard and pintle hook assembly as defined in claim 1, wherein said mount is secured to said main channel approximately equidistantly between said first and second ends of said main channel.

3. The rear impact guard and pintle hook assembly as defined in claim 1, wherein said mount is configured to have a pintle hook secured thereto.

4. The rear impact guard and pintle hook assembly as defined in claim 1, wherein said main channel has an upper vertical wall, an upper horizontal wall extending from a lower end of said upper vertical wall, a lower vertical wall extending from a front edge of said upper horizontal wall, and a lower horizontal wall extending from a lower end of the lower vertical wall, said groove being defined between said upper and lower horizontal walls and said lower vertical wall, said main channel further defining a pair of recesses through said upper vertical wall and said upper horizontal wall.

5. The rear impact guard and pintle hook assembly as defined in claim 4, wherein said recesses defined through said upper vertical wall and said upper horizontal wall of said main channel are equidistantly spaced from a center of said main channel.

6. The rear impact guard and pintle hook assembly as defined in claim 4, wherein said mount has a rear wall and a pair of sidewalls, each said sidewall having a front portion and a rear portion, said front portions abutting against said lower vertical wall of said main channel, said rear portions extending through said recesses formed through said main channel, said rear wall of said mount being configured to have the pintle hook releasably secured thereto.

7. The rear impact guard and pintle hook assembly as defined in claim 6, further comprising a mount plate which is secured at an upper end thereof to said upper vertical wall such that said mount plate faces said rear wall of said mount, said mount plate being configured to have the pintle hook releasably secured thereto.

8. A trailer comprising:
   roadside and curbside slide rails, each said slide rail generally extending from a front end of said trailer to a rear end of said trailer;
   a rear frame having an elongated horizontal sill;
   roadside and curbside bumper support members extending downwardly from said horizontal sill;
   a rear impact guard and pintle hook assembly including,
      a rear impact guard having a roadside bumper bracket and a curbside bumper bracket which are spaced apart from one another, each said bumper bracket being releasably attached to said roadside and curbside bumper support members, each said bumper bracket having upper ends,
      a main channel having first and second opposite ends and defining a groove which extends from said first end to said second end, said groove being open to said rear end of said trailer, said first end of said main channel being connected to said roadside bumper bracket, said second end of said main channel being connected to said curbside bumper bracket;
      a mount secured to said main channel between said first and second ends of said main channel;
      a first plurality of fasteners which are configured to releasably secure said respective upper ends of said roadside and curbside bumper brackets to said roadside and curbside slide rails; and
      a second plurality of fasteners which are configured to releasably secure said respective upper ends of said roadside and curbside bumper brackets to said roadside and curbside bumper support members.

9. The trailer as defined in claim 8, further comprising roadside and curbside spacer members, each said spacer member being positioned between said respective bumper bracket and said respective slide rail and allowing said first plurality of fasteners to releasably secure said upper ends of said roadside and curbside bumper brackets to said roadside and curbside spacers and to said roadside and curbside slide rails.

10. The trailer as defined in claim 8, wherein said rear impact guard further includes a bumper which is mounted to lower ends of each said bumper bracket.

11. The trailer as defined in claim 8, wherein said mount is secured to said main channel approximately equidistantly between said first and second ends of said main channel.

12. The trailer as defined in claim 8, further comprising a pintle hook which is secured to said mount.

13. The trailer as defined in claim 8, wherein said elongated horizontal sill has a cutaway portion, said bumper support members extending downwardly from said horizontal sill proximate to each side of said cutaway portion, said cutaway portion forming a clearance to allow said main channel to be mounted therein.

14. The trailer as defined in claim 13, wherein said cutaway portion is provided at a center of said elongated horizontal sill.

15. The trailer as defined in claim 8, further comprising a floor structure having a plurality of spaced-apart cross-members which extend across a width of said trailer and a plurality of roadside and curbside gussets which are attached to sides of said spaced-apart cross-members, said roadside bumper support member being aligned with said roadside gussets, said curbside bumper support member being aligned with said curbside gussets.

16. The trailer as defined in claim 15, wherein each said gusset is formed from a vertical wall and an angled wall which extends downwardly and outwardly from said vertical wall, said vertical wall configured to be secured to said side of said spaced-apart cross-member.

17. The trailer as defined in claim 16, further comprising a plurality of roadside and curbside intercostals, each said intercostal being formed from a plate and having an upper horizontal edge, a lower horizontal edge, front and rear upper vertical edges and front and rear angled edges, each said intercostal being provided between adjacent spaced-apart cross-members and adjacent gussets, said front and rear upper vertical edges sitting against said vertical walls of said gussets, said front and rear angled walls sitting against said angled walls of said gussets, said upper horizontal wall sitting under said spaced-apart cross-members, said lower horizontal wall sitting on said slide rails.

18. The trailer as defined in claim 8, wherein said main channel has an upper vertical wall, an upper horizontal wall extending from a lower end of said upper vertical wall, a lower vertical wall extending from a front edge of said upper horizontal wall, a lower horizontal wall extending from a lower end of said lower vertical wall, and a lower vertical wall extending from a rear edge of said lower horizontal wall, said groove being defined between said upper and lower horizontal walls and said lower vertical wall, said main channel further defining a pair of recesses through said upper vertical wall and said upper horizontal wall.

19. The trailer as defined in claim 18, wherein said recesses are equidistantly spaced from a center of said main channel.

20. The trailer as defined in claim 18, wherein said mount has a rear wall and a pair of sidewalls, each said sidewall having a front portion and a rear portion, said front portions abutting against said lower vertical wall of said main channel, said rear portions extending through said recesses formed through said main channel.

21. The trailer as defined in claim 20, further comprising a mount plate which is secured at an upper end thereof to said upper vertical wall such that said mount plate faces said rear wall of said mount.

22. A trailer comprising:
roadside and curbside slide rails, each said slide rail generally extending from a front end of said trailer to a rear end of said trailer;
a rear impact guard and pintle hook assembly; and
a plurality of fasteners which are configured to releasably secure said rear impact guard and pintle hook assembly to said roadside and curbside slide rails; and
roadside and curbside bumper support members provided proximate to or at said rear end of the trailer and a second plurality of fasteners which are configured to releasably secure said rear impact guard and pintle hook assembly to said roadside and curbside bumper support members.

23. The trailer as defined in claim 22, further comprising a pintle hook which is secured to said rear impact guard and pintle hook assembly.

24. The trailer as defined in claim 22, further comprising a bumper which is mounted to lower ends of each said bumper support members.

* * * * *